(12) United States Patent
Hanlon

(10) Patent No.: US 6,197,190 B1
(45) Date of Patent: Mar. 6, 2001

(54) TAPERED FLOCCULATION WATER TREATMENT

(76) Inventor: Patrick Hanlon, 19992 N. Manchester Rd., Sunman, IN (US) 47041

( * ) Notice: Subject to any disclaimer, the term of this patent is extended or adjusted under 35 U.S.C. 154(b) by 0 days.

(21) Appl. No.: 09/287,768

(22) Filed: Apr. 7, 1999

(51) Int. Cl.$^7$ ................................................. B01D 21/08
(52) U.S. Cl. ........................ 210/197; 210/208; 210/266; 210/305; 210/520; 210/521; 210/523
(58) Field of Search .................................. 210/194, 197, 210/207, 208, 219, 266, 299, 305, 520, 521, 532.1, 523

(56) References Cited

U.S. PATENT DOCUMENTS

| | | | | |
|---|---|---|---|---|
| 2,352,772 | * | 7/1944 | Varby | 210/208 |
| 3,300,047 | * | 1/1967 | Hirsch | 210/208 |
| 3,615,025 | * | 10/1971 | Rice et al. | 210/208 |
| 4,293,416 | * | 10/1981 | Keotehlian | 210/208 |
| 4,303,517 | * | 12/1981 | Love et al. | 210/520 |

FOREIGN PATENT DOCUMENTS

550842 * 4/1932 (DE) .

* cited by examiner

Primary Examiner—Christopher Upton

(57) ABSTRACT

Described herein is an improved water treatment process for separating particulate contaminants from raw water. The process is performed by introducing, into a single tank, raw water injected with a coagulating agent for neutralizing charges on the particles and a flocculating agent for agglomerating the neutralized particles; mixing, in the mixing area of said tank, the neutralized and agglomerated particles with a granular medium to increase the size and weight of the particles; directing the particles and water from the mixing area of said tank to a baffled quiescent zone for settling; further directing said water, free of settlement, in said quiescent zone through a buoyant medium to entrap unsettled particles; and wherein the improvement is characterized by conducting tapered flocculation in the mixing area of said tank with a turbine mixer having a plurality of radial blades of varying surface areas, said blades tapered in decreasing areas as the distance from the point of influent increases.

7 Claims, 4 Drawing Sheets

TAPERED FLOCCULATION WATER TREATMENT

BACKGROUND OF THE INVENTION

This disclosure relates to a system and method for removing contaminants, both colloidal and suspended particles, from raw water at a high rate of treatment. The disclosed method and system use previously known water treatment procedures that have been shown to be effective, efficient and reliable; but the disclosed method and system combine the known elements of water treatment in a single-tank procedure with tapered radial-blade mixing that achieves even greater water purity with higher flow application rates.

DESCRIPTION OF THE PRIOR ART

As stated, the system and process in this disclosure borrow heavily from proven water treatment techniques developed over the past 100 years. For instance, the idea for initially treating raw water with a chemical coagulant such as alum, ferric chloride and the like to destabilize suspended particles in raw water by neutralizing the electrochemical charges typically found on colloidal particles and contaminants is well known, and the destabilization of suspended particles in raw water by using chemical coagulants continues to be employed in the disclosed system.

Similarly, the use of polyelectrolyte flocculates to facilitate the attachment and growth of neutralized particles is also known in the art and unabashedly incorporated as part of the disclosed system.

Also the use of a granular medium to increase the size and weight of agglomerated and flocculated particles is previously known from French Patent 1,411,729.

U.S. Pat. No. 4,927.543 describes a commercial process called "Actiflo" which uses lamella separator plates or tubes in a process that uses sand to assist in flocculation and settling. The sand is injected into the "upfront" rapid mixing tank—usually two rapid-mix tanks are used—followed by a separate flocculating tank. Then, the flocculated flow is passed on to a separate settling tank having lamella plates or tubes. The Actiflo™ process, by using two rapid-mix tanks, a flocculating tank and a separate settling tank, is a refinement of prior art sand-assisted flocculation and settling.

Furthermore, the prior art typically calls for precise chemical additions in the first tank and high-energy mixing in the range of 1,000 to 1,500 Gs to prepare the coagulant to flow to a second rapid-mix tank. In the second rapid-mix tank, sand and a flocculating chemical are added and, again, high energy mixing in the range of 1,000 to 1,500 Gs is applied. The mixture then flows to a separate flocculation or maturation tank with lower energy mixing in the range of 400 to 900 Gs. After the maturation tank, the sand/floc. mixture goes to the settling tank while lamella plates or tubes assist in clarification. More recently, U.S. Pat. No. 5,730,864 has contributed to the prior art by disclosing precise chemical additions in two separate mixing tanks and high-energy mixing in the range of 900 to 1,400 Gs for each tank. Fine sand is added to the second rapid-mix tank along with polymers and high-energy mixing. Then, the mixed flow moves to a separate maturation or flocculating tank and finally to a separate settling tank. In the '864 patent, no lamella plates or tube is used. The inventive aspect of the '864 document also involves the creation of a vortex or cyclone to assist in solids removal efficiency in the settling tank. No other device or mechanism is utilized in the separation of solids from the water in or beyond the settling zone, and specific settling rates greater than 15 m/h are alleged.

U.S. Pat. No. 3,343,680 describes an upflow filtration process using a buoyant medium. This technique was designed to be a final step in a water filtration process, but inefficiencies in cleaning the filter medium have become apparent resulting in commercial dissatisfaction.

U.S. Pat. No. 4,115,266 also discloses the use of a buoyant medium in a treatment process. Typically, a series of tanks is used and air is bubbled under the medium for cleaning the medium to remove entrapped contaminants.

U.S. Pat. No. 4,547,286 describes a commercial process known as "Trident™" using a buoyant medium filter in its process. This disclosure specifically describes the use of a buoyant medium as an upflow filter followed by a non-buoyant medium downflow filter. In addition to using two media, the Trident system utilizes 2 or 3 separate tanks and alleges that flocculation and adsorption occur within the buoyant media filter, thereby eliminating a settling zone.

SUMMARY OF THE INVENTION

Notwithstanding the attributes of the components and steps of the prior art, the disclosed system, using known elements in combination with a mixer having a plurality of tapered radial blades generating high-energy mixing followed by tapered flocculation, produces higher treatment rates with no deterioration of effluent quality. Furthermore, the disclosed system and process provide for solids removal with a decrease in chemical costs, a reduction in energy use and a reduction in the civil "footprint".

Specifically, what is disclosed herein is an improved water treatment system for separating contaminants from raw water. The system utilizes a continuous-flow, single-tank process that begins by introducing into said tank, raw water that has been injected with a coagulating agent for neutralizing charged particles and a flocculating agent for agglomerating the neutralized particles; and includes;

mixing, in the mixing area of said tank, the neutralized and agglomerated particles with a granular medium to increase the size and weight of the particles;

directing the particles and water from the mixing area of said tank to a baffled quiescent zone for settling;

further directing said water, free of settlement, from said quiescent zone through a buoyant medium to entrap unsettled particles; and wherein the improvement is characterized by conducting tapered flocculation in the mixing area of said tank with a turbine mixer having a plurality of radial blades of varying area, said blades tapered in decreasing area as the distance from the influent increases.

DESCRIPTION OF THE PREFERRED EMBODIMENTS

Figure 1:
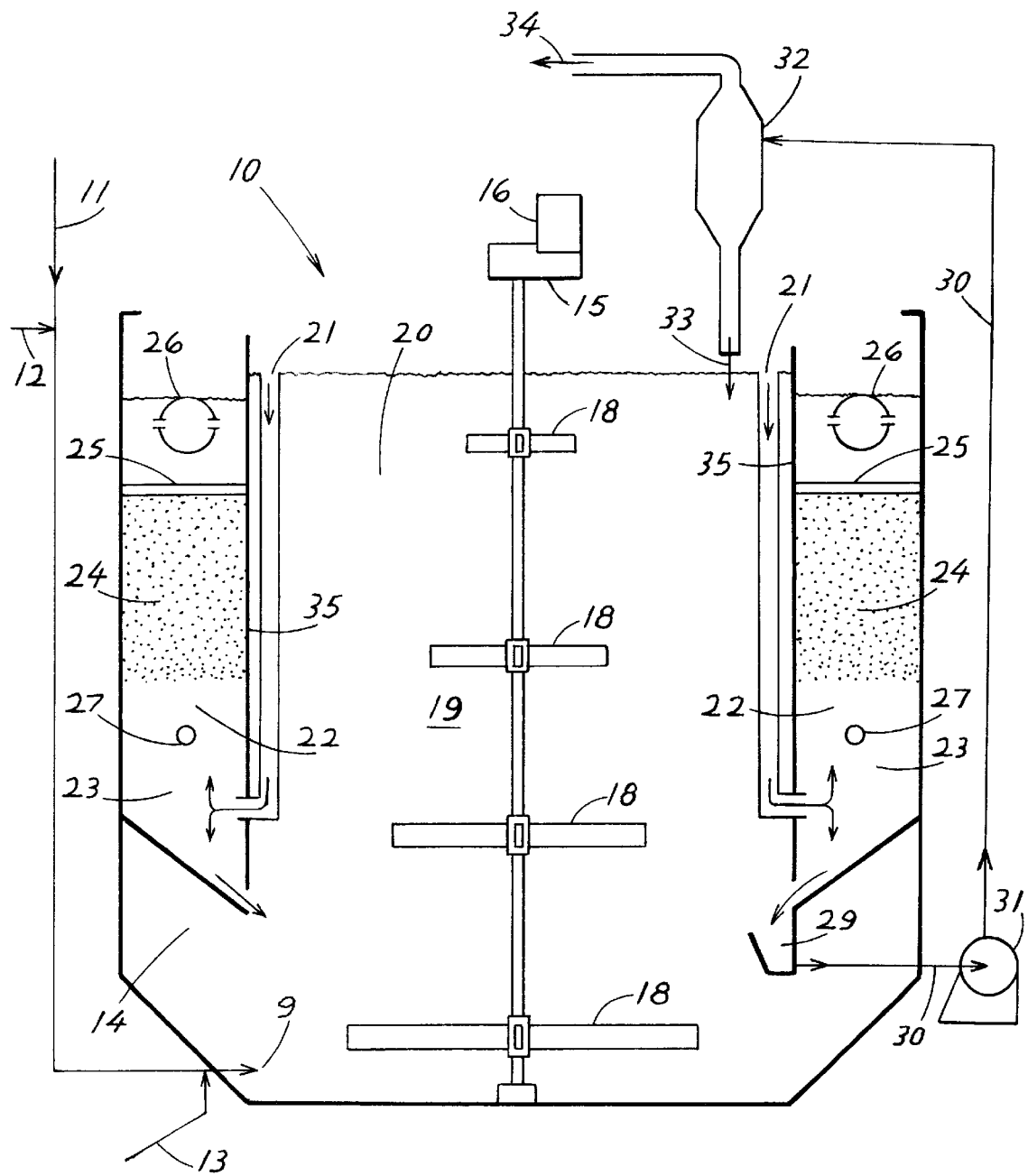
FIG. 1 is a schematic depiction of the disclosed system and process for the clarification of raw water by tapered flocculation.

Referring immediately to the schematic representation of the clarification system and process as set forth in FIG. 1, the reader is directed to the influent pipe 11 containing raw water to be clarified by the system 10. This water typically contains colloidal and particulate contaminants, and it is these contaminants that are intended to be removed by the disclosed system and process. To initiate the removal of contaminants, the raw water is injected with a coagulating chemical entering the system 10 at point 12 The purpose of the coagulant is to neutralize the positive or negative charge that is typically found on colloidal and suspended particles in raw water. By neutralizing the charge on suspended particles, the particles do not repel one another.

After the raw water has been injected with a coagulating agent, a polyelectrolyte flocculant is added. The point of addition is schematically depicted at point 13. The purpose of the flocculating agent is to agglomerate the particles neutralized by the coagulating agent.

The chemically injected raw water enters the tank 14, preferably in the lower quadrant, and is introduced to vigorous mixing and a suspension of a granular medium, typically sand. The mixing is conducted by a turbine mixer 15 having a plurality of radial blades 18. These radial blades will typically have surface areas that vary in size from one blade to the next. Generally the blades with the larger surface areas, i.e., those capable of generating a higher mixing energy, typically in the range of 600 to 1,000 Gs, will be nearer the influent portal 9. This will insure that the contaminants in the influent are subjected to the maximum opportunity for collision and attachment with the granular medium and flocculants. In some preferred embodiments, a re-circulation area is created with a draft tube 21 or re-circulation 17 hood to intensify the mixing energy within the mixing area of said tank. As the mixture in the mixing area 20 of the tank migrates away from the influent portal 9, the energy needed for flocculating is reduced and the surface areas of the radial blades are reduced. In other words, this gradual reduction in the surface area of the blades generates less mixing energy in the tank and creates a tapered mixing effect. It is this tapered mixing effect that permits coagulation, flocculation and mixing to occur in a single-tank system. So, to reiterate somewhat, the tapered flocculation process introduces higher mixing energy near the influent portal where coagulation is initiated and less and less energy in the flocculated particles mixture as it migrates from the vicinity of the influent portal 9 throughout the mixing area 20. This tapered mixing energy imparts the level of mixing needed to facilitate both particle growth and tapered flocculation. If the energy of mixing were uniform throughout the mixing area of the tank, it would be either too weak and insufficient to insure contaminant contact with the coagulating chemicals and/or too great to permit the formation of large flocculated particles. It is because of the varying energy created by the tapered surface areas of the plurality of radial blades 18 affixed to the shaft of the turbine mixer 15, that coagulating, flocculating and mixing can occur in the single-tank configuration. Furthermore, said coagulating, flocculating and mixing can be enhanced, in certain instances, by creating a high-energy re-circulation zone 19 with a draft tube 21 or re-circulation hood 17 positioned in the mixing zone according to the depictions in FIGS. 2 and 3.

As the chemically treated raw water is conditioned by the coagulating and flocculating, the water in the mixing tank that has migrated to an area of low-energy mixing is directed by a channel 21 that leads to a baffled area 22 of the tank. The baffles 35 separate the mixing zone 20 of the tank from the quiescent settling/clarification zone 23 in the baffled area 22.

To increase the efficiency of the clarification process, there are typically two baffled areas in the single-tank system. And to reiterate, somewhat, water from the lower-energy mixing area of the mixing zone 20 is directed by channels 21 into the lower-quadrant of the baffled area 22. This lower quadrant of the baffled area is denominated the quiescent settling/clarification zone 23. In this zone, the heavy, sand laden particles will settle and fall back into the mixing zone 20, and any unflocculated light contaminants will flow upward to be trapped by a buoyant clarifying medium 24. This buoyant medium traps and removes the finer contaminants remaining in the clarified water. Water that has been refined by the buoyant medium is removed by a collecting pipe 26 for ultimate use, or in most instances, further processing.

The upflow buoyant clarifying medium 24 will eventually become laden with solid contaminants. To effect a cleaning of the buoyant medium, air scour piping 27 is installed below the medium. When necessary, air is blown through the air scour piping into the water below the buoyant medium. The bubbling air decreases the specific gravity of the water in the area beneath the medium and the buoyant medium expands downward, opening up voids and causing tumbling and scouring of the buoyant medium. The continuing influent flow washes the solids released from the medium out to waste. This is typically done by closing a clarified water valve and opening a waste water valve beyond the collecting pipe 26 to divert waste-laden water, collected during the flushing procedure to containment tanks for further treatment.

The buoyant medium 24 is held in the clarifying zone 23 by a retaining screen 25, which keeps the medium in place but allows the clarified water and dirt and particulate to pass through to waste during the flushing cycle.

The flocculated contaminated particles that are attached to the sand in the mixing zone need to be removed as they build up in the system. To accomplish this, a recycle of sand/sludge pump 31 is used to pump the solid-laden sand out from the solids concentration area 29. The size of this concentration area should be sufficient to catch and contain 5% to 10% of the recycled sand/sludge in the system. The solids are pumped through a sand separation device 32, such as a cyclone separator, in which the flow is injected tangentially creating a centrifugal effect that throws the heavier sand to the outside. The cleaned sand recycles back into the mixing zone 33 and the lighter, coagulated colloidal material and contaminants are forced up and out of the center of the cyclone separator to waste 34. The sand/sludge recycle stream should be between 2% to 5% of the influent flow.

Figure 4:
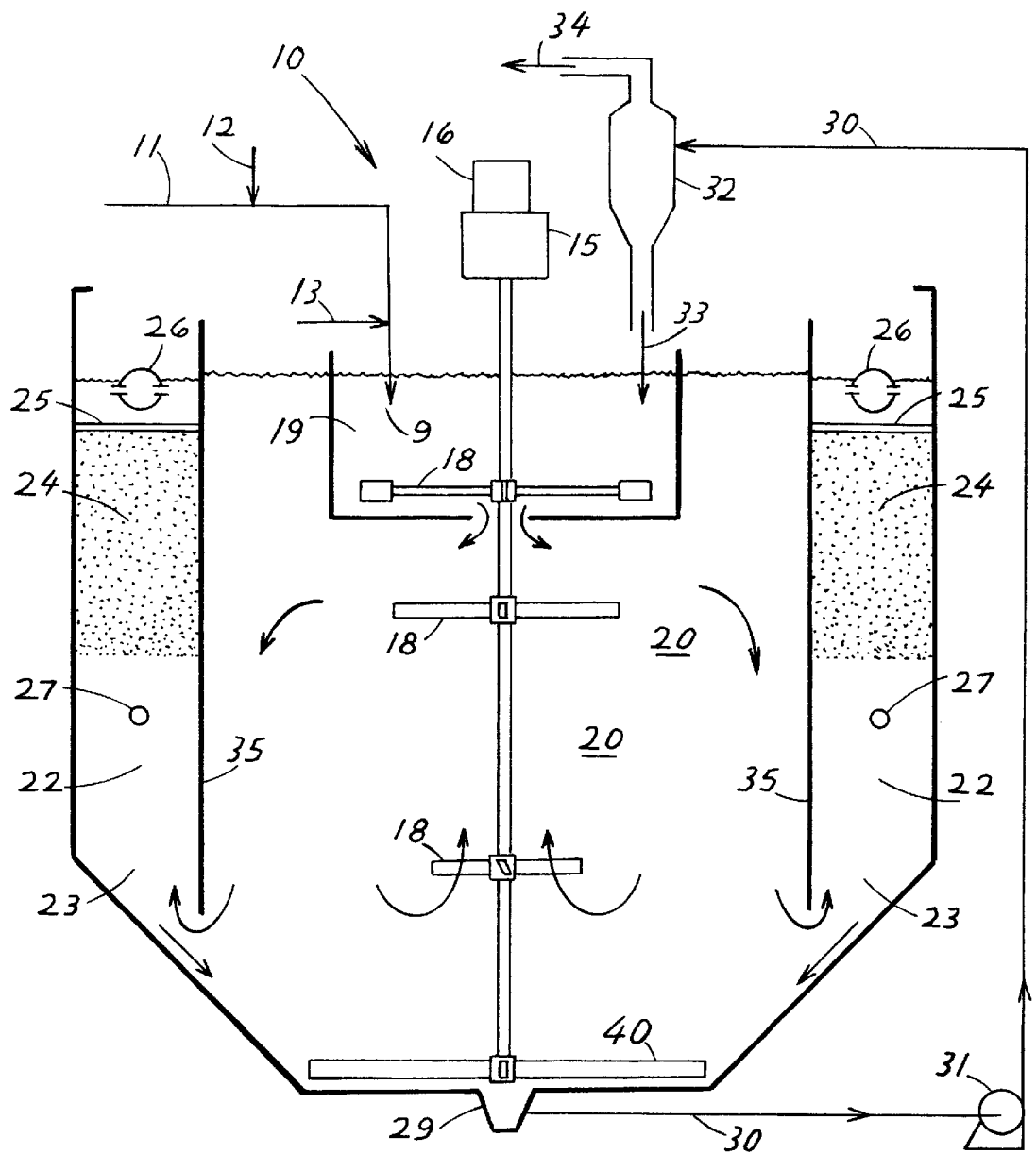
FIG. 4 is a schematic depiction of the disclosed system and process wherein the influent enters the system in the upper quadrant of the tank.

In those instances where the re-cycle stream needs to be increased, it may become necessary to introduce into the system 10 a slightly different mixing arrangement. FIG. 4 depicts a system having a sludge scrapper 40 at, or near, the very bottom of the tank. This scrapper is driven by a separate drive mechanism 16. This arrangement, in conjunction with a larger and more deeply situated sledge well 29 will significantly increase the re-processing of granular medium.

Figure 2:
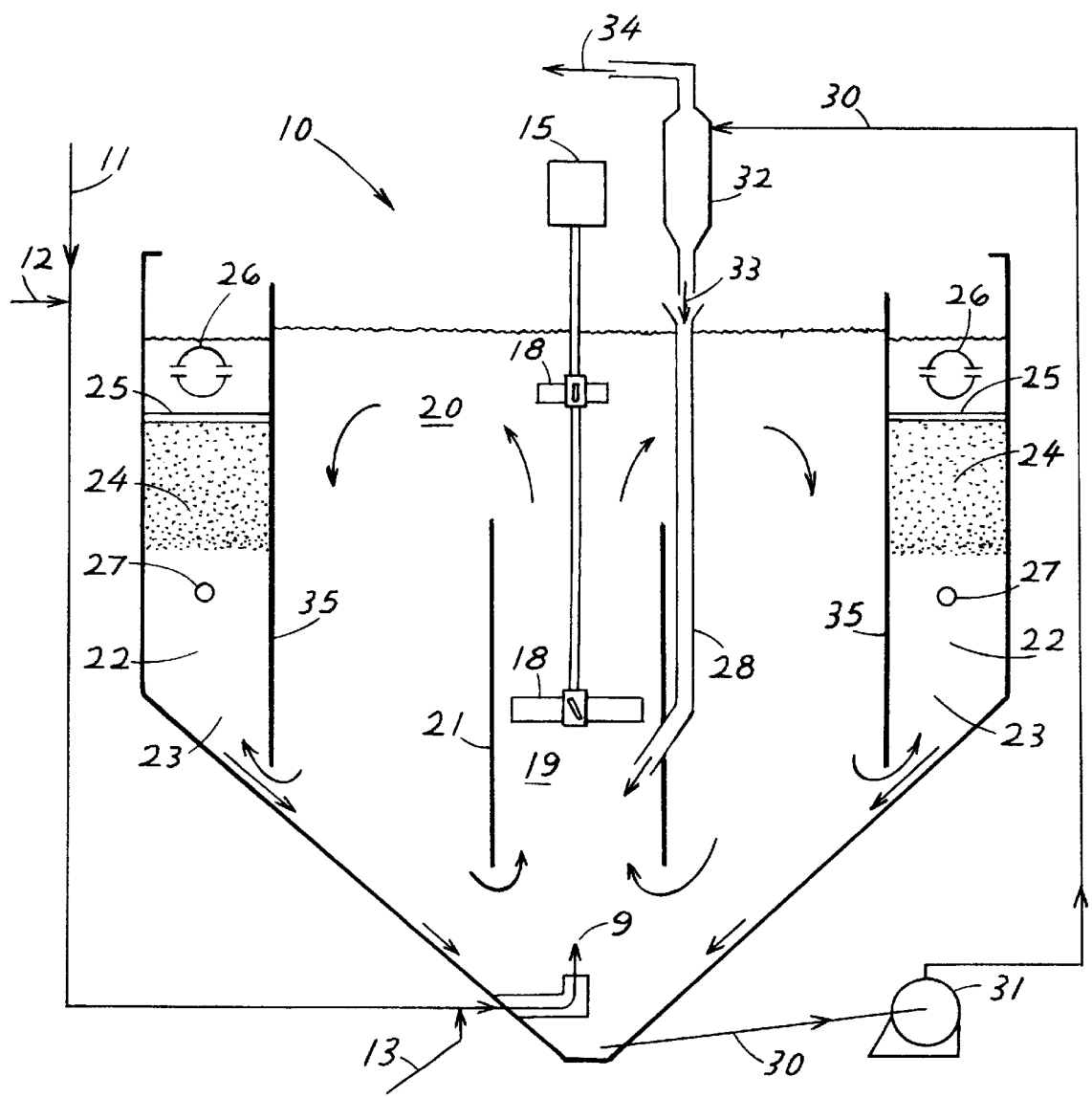
FIG. 2 is a schematic depiction of the disclosed system and process having a re-circulation area for high-energy mixing defined by a draft tube in the tank.
Figure 3:
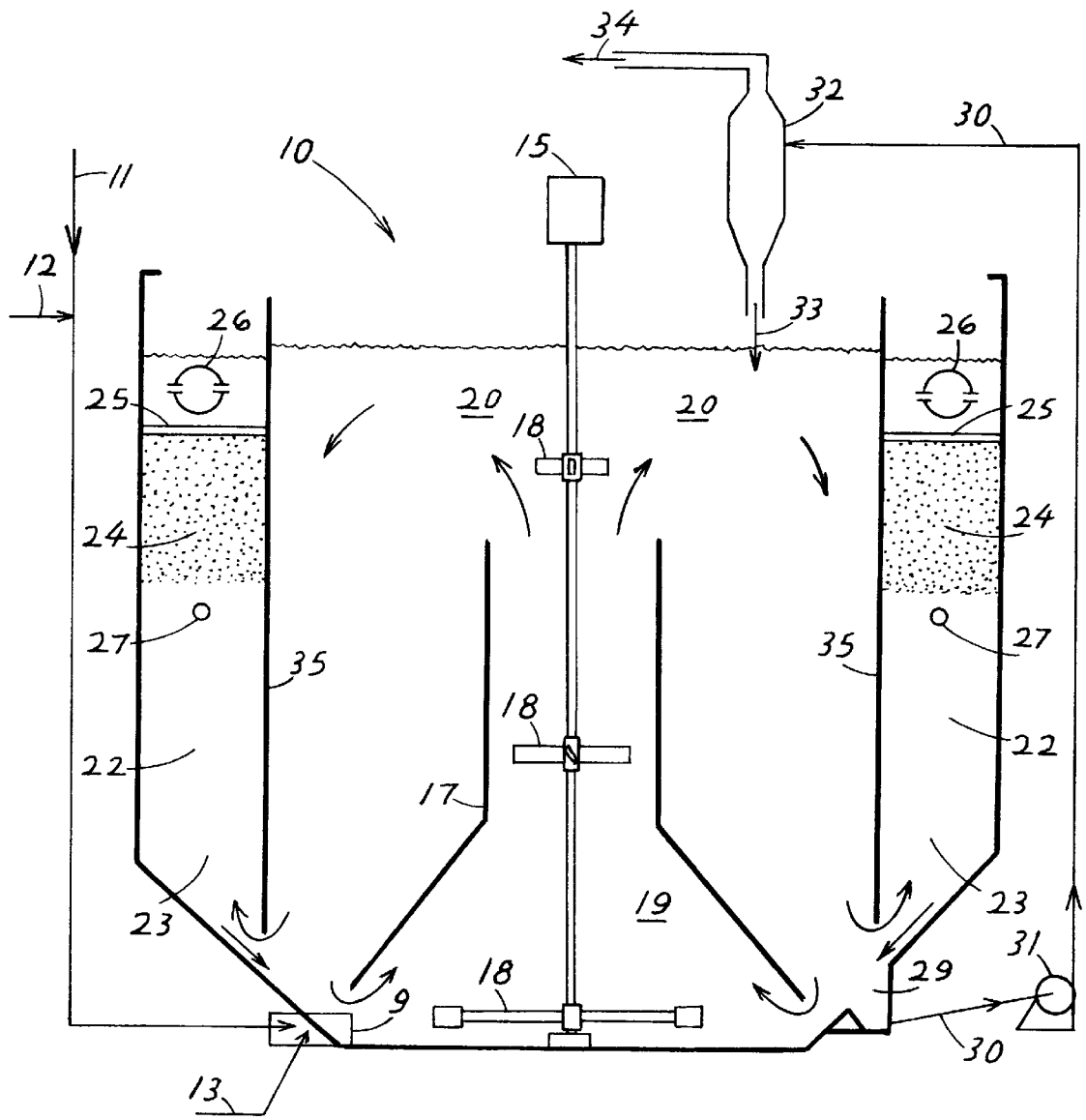
FIG. 3 is a schematic depiction of the disclosed system and process having a re-circulation area for high-energy mixing defined by a re-circulation hood in the tank.

Another variation in the re-cycling stream is seen in FIG. 2 where recycled granular medium is channeled 28 directly into the high energy mixing area zone 19 to enhance and expedite the removal of flocculated contaminants.

To summarize, again, the system of this disclosure offers a method for processing raw water that is typically contaminated with colloidal and suspended particles. The disclosed system provides a continuous flow, single tank process that will remove the colloidal and suspended contaminants with improved efficiency and a reduced investment in capital equipment.

The system and process of the present disclosure can be further illustrated by the following example of a Typical Treatment Scenario: A feed of alum at 14 mg/l is added to raw water with a turbidity of 11 NTU to effect coagulation. A feed of 0.3 mg/l of a cationic polymer is required to flocculate and attach the coagulated particles to the granular medium (sand). A sand volume of 5–8 g/l is recirculating in the mixing tank. Empirical data confirm that the 11 NTU raw water turbidity will be reduced to 0.75 NTU, or lower, in the clarified effluent. The clarifying section of the system could be sized at 15 gpm per square foot rise rate or higher. Unless the flow or the influent solids change, this treatment will achieve study state within 12 to 20 minutes from start-up.

The recycle stream of sand/sludge 30 of 3% to 4% of the total flow is pumped with a 5 hp pump 31 to achieve the recycling of cleaned sand 33 back to the mixing area of the tank and purging the contaminants to waste.

Ninety to ninety-eight per-cent of the influent solids will be removed with the settled sand/sludge fraction. Over a period of time, 1 to 3 times per day, the buoyant medium 24 in the clarifying zone 23 will need flushing. The clarified water valve is closed and the waste valve is opened in the effluent line. Air is released under the medium which will expand the medium downward, opening voids, and causing tumbling and scouring. After 1 to 2 minutes of scouring, the air is turned off, and after about another minute, the buoyant medium will reconstitute and the last vestiges of trapped contaminant will be flushed out as waste. The clarified water valve is opened and the waste valve is closed. The total flushing time is approximately 3–4 minutes.

While the desire for a laminar radial flow mixing pattern requires the use of larger radial blades capable of creating high-energy mixing in the influent area of the mixing zone; and reduced-size blades, generally having a smaller mixing moment and less surface area are used in the flocculating zones of the tank so that they get progressively smaller, thus promoting tapered flocculation, as they become more remote or removed from the influent, the varying flows or concentrations of influent contaminant and re-circulating sand require a variable-speed mixing arrangement. At a flow of 1 million gallons per day and a tank dimension of 6–10 times the influent flow, a hp requirement would be 7.5 and a variable speed of 50 RPM to 185 RPM would be required to give a tip speed of the blades to produce a sufficient mixing/blending moment. A typical system treating 1 million gallons per day will require a tank of approximately 10 feet square by 11'2" high.

While the foregoing is a complete and detailed description of preferred embodiments of the disclosed system, numerous variations and modifications may also be employed to implement the all-important purpose of the invention without departing from the spirit of the invention; and, therefore the elaboration provided should not be assumed to limit, in anyway, the scope of the invention which is fairly defined by the appended claims.

What is claimed is:

1. In an improved water treatment system for removing contaminants from raw water, said system comprising:

means for introducing into a single tank an influent of raw water that has been injected with a coagulating agent for neutralizing charged particles and a flocculating agent for agglomerating the neutralized particles;

means for mixing, in a mixing area of said tank, the neutralized and agglomerated particles with a granular medium to increase the size and weight of the particles;

means for directing the particles and water from the mixing area of said tank to a baffled quiescent zone for settling;

wherein the improvement comprises means for further directing said water, free of settlement, in said quiescent zone through a buoyant medium to entrap unsettled particles; and means for conducting tapered flocculation in the mixing area of said tank with a turbine mixer having a plurality of radial blades of varying area, said blades tapered in decreasing area as the distance from the influent increases.

2. The improved water treatment system according to claim 1 wherein the influent enters the tank in the lower quadrant of said tank.

3. The improved water treatment system according to claim 1 wherein the granular medium is sand.

4. The improved water treatment system according to claim 1 having multiple baffled quiescent zones.

5. The improved water treatment system according to claim 1 wherein the mixing area of said tank further comprises a re-circulation area to intensify the mixing area of said tank.

6. The improved water treatment system according to claim 5 wherein the re-circulation area is defined by a draft tube.

7. The improved water treatment system according to claim 5 wherein the re-circulation area is defined by a re-circulation hood.

\* \* \* \* \*